3,287,144
CARBON-IMPREGNATED REFRACTIVE MAGNESIA BODIES AND METHOD OF PREPARING THE SAME
Friedrich Hodl, Vienna, and Georg Bouvier, Leoben, Austria, assignors to Veitscher Magnesitwerke-Actien-Gesellschaft, a corporation of Austria
No Drawing. Filed Aug. 4, 1964, Ser. No. 387,495
Claims priority, application Austria, June 20, 1961
A 4,760/61
7 Claims. (Cl. 106—56)

This is a continuation-in-part of our application Serial No. 200,959, filed June 8, 1962, now abandoned.

This invention relates to refractories, and more particularly to carbon-impregnated magnesia bricks and larger structural elements and to a method of preparing the same.

An important object of the invention is the provision of refractory bricks and larger structural elements suitable as lining materials in converters in which steel is made by means of substantially pure elementary oxygen fed to a ferrous melt.

A more specific object is the provision of refractory bodies which are capable of resisting the high temperatures generated in the oxygen treatment of ferrous melts in the presence of reducing materials.

Another object is the provision of refractory bodies which have high mechanical strength and are dimensionally stable under the afore-described conditions of use.

A further object is the provision of refractory bodies which are highly resistant to slag corrosion in the presence of a reducing atmosphere, and which do not deteriorate when subjected to thermal shock.

Elementary oxygen is being used in the conversion of pig iron, steel scrap and similar raw materials at an increasing rate per unit weight of the raw material as the advantages of oxygen steel making become better understood. The feeding of solid materials to oxygen converters is becoming increasingly common whereas charges and addition agents were fed to such converters in the molten state only until a relatively short time ago.

The increased consumption of oxygen significantly increases the thermal stresses to which refractory converter linings are subjected. The large amounts of oxygen supplied to the converter also agitate the converter contents so as gradually to increase chemical attack on the refractory converter lining by the slag and the metal melt. Solid materials present in the slag or the melt additionally subject the lining to abrasion and other mechanical stresses.

High mechanical strength, dimensional stability at high temperature, resistance to slag corrosion and to reducing atmospheres, such as are encountered in oxygen converters, and adequate resistance to abrupt temperature changes have not been satisfactorily combined in known refractory bodies. These several requirements are partly contradictory. Good resistance to thermal shock, for example, is associated with relatively high porosity, yet pores invite slag corrosion.

A relatively good combination of the afore-enumerated properties was heretofore available only in sintered magnesia bodies whose grains were ceramically bonded by integral welds, and whose pores were substantially filled with carboniferous materials, such as tar or pitch when the sintered granular material had a magnesium oxide content of at least 96%. The raw materials necessary for producing refractory bodies of such high magnesium oxide content are not commonly available and are, therefore, relatively expensive.

We have found that refractory bodies of even superior properties can be prepared from raw material lower in magnesium oxide content if certain other critical limits are maintained. These limits only partly relate to the chemical composition of the bodies which should consist of at least 90% of sintered magnesia particles containing as impurities no more than 2.5% $Fe_2O_3$, no more than 2% $SiO_2$ and no more than 5% CaO, and 93 to 96% MgO. For best results, the impurities should not exceed 1.2% $Fe_2O_3$, 1% $SiO_2$ and 3% CaO. The porosity of the individual sintered grains should not exceed 8%, and the intergranular porosity of the sintered magnesia structure should be between 12 and 22%, and preferably not higher than 20%. The pores in the sintered structure should be filled with carbon to the greatest extent possible, and it is important that the carbon filling of the pores should be uniform over the entire cross section of the refractory bodies. The aluminum content of the sintered grains should be such that the combined value of $Al_2O_3+Fe_2O_3$ does not exceed 3%, and preferably is not higher than 1.5%.

If the limits outlined above are carefully maintained, superior refractory bodies are obtained even at the relatively low magnesium oxide content of 93%, and less than 96%, which is readily achieved with the use of relatively abundant raw materials and thus at economically practical expense.

The high mechanical strength, dimensional stability at high temperatures, resistance to basic slags and lack of sensitivity to sudden temperature changes characteristic of the refractory bodies of the invention can be fully maintained only if infiltration of pores in the refractory material by fused slags is substantially prevented. The composition of the refractory bodies must remain uniform throughout, and to the very surface. The uniform carbon impregnation is effective in preventing slag infiltration in the refractory bodies of the invention over surprisingly long periods.

It has been found that iron oxides present in otherwise pure magnesia yield free oxygen at temperatures higher than about 800° C., and that this oxygen causes combustion of the carbon impregnation. Typically, a sintered magnesia brick relatively high in iron oxides and initially containing 2.5% carbon as a pore impregnant, was found to contain only 0.2% carbon when subject to firing at 1300° C. in a reducing atmosphere for a fixed period. A refractory body of the invention having an iron oxide content within the limits set forth hereinabove retained more than 2% of its carbon content under otherwise identical conditions.

We have also found that it is important to combine individual sintered magnesia grains of very low porosity in a structure whose intergranular porosity is within conventional limits, that is, moderate. A magnesia structure composed of dense grains is stable in its structure and in its phase composition, and does not significantly shrink when subjected to high operating temperatures. Dense grains have a relatively small internal surface and thus readily resist slag attack.

A very dense grain structure can be achieved by admixing addition agents, known in themselves, to magnesia, magnesite, or similar powder, and then heating the powder until its particles agglomerate to the desired grain size. Such addition agents, however, are not permissible in magnesia refractories intended for service at very high temperatures and having a very high magnesium content. It is also possible to obtain dense, granular magnesia from decomposable magnesium compounds or pulverulent magnesia at very high firing temperatures, that is, 1800° C. or more. Grains produced at such high temperatures are burnt dead and no longer capable of undergoing further reactions. The upper temperature limit of firing the magnesia grains in preparing the refractory bodies of the invention is thus determined by the melting point of magnesium oxide and it is preferred to prepare the granular material by at least partial fusion of the crude magnesia.

The temperature at which the grains are sintered should not be too high. As the sintering temperature is raised, more phases of the material are fused. The sintered product is embrittled by the resulting internal stresses and thus has lower resistance to thermal stresses. We have found that the best sintering temperature for the refractory bodies of the invention is between 1650° C. and 1700° C., and the resistance of the refractory bodies to thermal shock (spalling resistance) is reduced by departure from the optimum range, although material sintered at higher temperatures retains at least some of the desirable properties.

The slag attack which could result from the relatively high intergranular porosity in the refractory bodies of the invention is suppressed by filling the pores as completely as possible with carbon or graphite uniformly distributed over the cross section of the refractory body. Known methods and materials are availbale for achieving carbon impregnation.

Typical granular materials from which refractory bodies of the invention may be prepared by methods conventional in themselves are dead burned magnesites and magnesia from sea water which are crushed and sized to the desired sieve analysis. The granular material is mixed with a minor amount of a bonding agent intended to provide green strength to compacts produced under pressure from the granular mixture. The green compacts are then fired at the sintering temperature indicated above, impregnated with carboniferous material, and again heated to coking temperature. Since the individual steps employed are known in themselves, they will not be described in detail. More specifically, the influence of compacting pressure on the porosity of the sintered material is well known and does not require illustration.

The chemical analyses of dead burned magnesites and magnesia listed in Table I are typical of raw materials suitable for preparing the refractory bodies of this invention. In all instances, the firing temperature had been above 1800° C. in order to achieve the desired grain porosity of less than 8%.

TABLE I

| Raw Material Fired | $SiO_2$ | $Fe_2O_3$ | $Al_2O_3$ | CaO | MgO (Balance) |
|---|---|---|---|---|---|
| Turkish Magnesite | 0.5-1.5 | 0.5 | 0.3 | 2.7-3 | 94.7-96.0 |
| Floated Austrian Magnesite | 1 | 1.5 | 0.3 | 3 | 94.2 |
| Do | 0.5 | 1 | 0.5 | 2 | 96 |
| Greek Magnesite | 2.6 | 0.5 | 0.4 | 2.0 | 94.5 |
| Magnesia from sea water | 2.0 | 1.5 | 0.2 | 2.5 | 93.8 |

We prefer to saturate the sintered porous refractories of our invention with carboniferous liquids which are then decomposed at high temperature and/or pressure to yield a carbon residue. Suitable impregnating fluids include the residual materials found in the still in the destructive distillation of bituminous coal or of wood, and the distillation residues obtained in the fractionation of petroleum. Tars of every origin and similar organic materials of undefined composition high in carbon and liquid at ordinary or elevated temperature, are well suited for the impregnation of the sintered porous magnesia bodies. The impregnated bodies are heated to coking temperatures (approximately 600° C. ∓ 200° C.) whereupon impregnation may be repeated, and is again to be followed by firing until the desired amount of carbon is deposited in the pores. The ultimate porosity should not exceed 2%, and is preferably near 0%.

Penetration of the porous sintered structure is enhanced by impregnation in a vacuum of no more than 150 torr, that is, by withdrawing air from the pores of the magnesia body prior to immersion in the liquid impregnant.

Graphite, anthracite and other solid materials high in carbon content may be suspended in volatile solvents, and the porous magnesia bodies may be impregnated with the suspensions, whereupon the solvent is evaporated, leaving the carbon in the pores. This technique, which may be combined with vacuum treatment of the porous bodies prior to immersion in the suspension of carboniferous solids, also permits the pores in the sintered bodies to be substantially filled with carbon uniformly distributed over the cross section.

We have found that the thermal shock resistance of the sintered refractory bodies of the invention can be improved by admixing to the granular magnesia prior to sintering granular synthetic aluminum-magnesium spinell, alumina or chromite in amounts totaling no more than 10%, so that the admixed spinell, alumina or chromite are present in the sintered material as distinct phases.

Table II lists typical combinations of granular magnesia and the afore-mentioned admixtures which yield the refractory bodies of the invention when compacted to produce the desired porosity after sintering, fired at 1650° to 1700° C., and impregnated with carbon.

TABLE II

| Constituent | Grain Size, mm. | Composition (percent by weight) | | |
|---|---|---|---|---|
| | | I | II | III |
| Turkish dead burned magnesite | 2-5 | 60 | 40 | 50 |
| Do | 0-2 | 20 | 20 | 10 |
| Austrian burned floated magnesite | 0-2 | | 20 | 15 |
| Turkish burned and ground magnesite (flour) | 0-0.2 | 20 | 12 | 15 |
| Alumina | 0-0.2 | | 8 | |
| Mg-Al-Spinell | 0-0.2 | | | 10 |

In the three compositions shown in Table II, 25°Be magnesium sulfate solution was employed as a bonding agent prior to sintering in an amount of 4% of the combined granular material. It was completely decomposed during sintering.

The following examples further illustrate preferred impregnation methods and the performance of refractory magnesia bodies of the invention, but it will be understood that the invention is not limited to the examples.

*Example I*

A mixture was prepared from magnesia containing less than 1.2% $Fe_2O_3$, 1.5% $Fe_2O_3+Al_2O_3$, 1% $SiO_2$, and 3% CaO as impurities, and having an intragranular porosity of substantially less than 5% and the following grain size classification:

| Grain Size, mm. | 2-5 | 0-2 | 0-0.15 |
|---|---|---|---|
| Percent by weight | 40 | 40 | 20 |

A small amount of sulfuric acid was admixed as a bonding agent, and the mixture was shaped in a mold under a pressure of more than 1500 kg./cm.² to the desired brick shape. The green bricks were fired at 1650° C. to 1700° C. They were thereby sintered to a porosity of 17–18% (by volume).

A batch of the sintered bricks was immersed in hot, heavy tar (sp. gr. 1.2, about 200° C. ) in a vessel evacuated to 110 torr. After air had been removed from the pores in the bricks as far as possible, the vacumm was gradually released over a period of about 3 to 10 minutes, and atmoshperic pressure forced tar into the pores. The bricks were withdrawn from the tar and fired at 600° C. to substantially complete carbonization. The vacumm impregnation and firing were then repeated.

The amount of carbon absorbed in the pores was 6.5%, based on the sintered material. The residual intergranular porosity was 0.63% by volume.

When twice immersed in the same tar at atmospheric pressure for 30 minutes and fired, another batch of the sintered bricks absorbed only 4.6% carbon, corresponding to a residual porosity of 6.21% and to a filling of the pores to 67%.

*Example II*

Respective portions of a furnace subject to analogous chemical, mechanical, and thermal stresses were lined with the vacuum impregnated bricks of Example I, with the gravity impregnated bricks of Example I, with bricks of Example I that had not been impregnated, and with bricks prepared in a conventional manner by bonding granular magnesite (not burned) with 6.5% heavy tar.

The furnace was charged with fresh electric furnace slag and kept at 1650° to 1700° C. for ten hours while a strongly reducing atmosphere was maintained in the furnace. The slag was then run off, the furnace was permitted to cool, and the brick lining was inspected.

The vacuum impregnated bricks of the invention still had a smooth surface and there was no evidence of significant slag attack. The slag had penetrated about 10 mm. into the gravity impregnated bricks, and the surface of the bricks had been altered to some extent because of modification of the dicalcium silicate in the slag during cooling. The bricks had lost 3 to 4% of their weight.

The non-impregnated bricks were penetrated by slag to a depth of 30 to 40 mm., and their surface had been very strongly attacked. Weight loss was between 15 and 20 percent. The tar-bonded magnesite bricks had been penetrated to a depth of 10–20 mm. by the slag, their surface was strongly attacked, and their weight loss amounted to 8-10%.

The bricks and other refractory structural bodies of the invention provide superior linings for metallurgical process vessels which have to withstand a combination of extremely high temperatures, a rapid stream of oxygen supply and the resulting vigorous agitation of the vessel content, a corrosive slag, and a reducing environment.

The refractory bodies of the invention can be prepared from relatively abundant and inexpensive magnesite from which a granular magnesia containing as little as 93% MgO is readily prepared. It will be appreciated that availability and cost are related to magnesium oxide content in such a manner that refractory bodies whose sintered grains contain 93 to 94% MgO are most economical, and those containing 94 to 95% MgO are still preferable to those containing less than 96%, but more than 95% MgO.

All causes of the superiority of our refractory furnace linings over others having higher magnesium content, but not otherwise meeting the requirements set forth hereinabove have not yet been fully elucidated, but it appears that the needle-like crystal structure of the magnesia derived from mineral sources (magnesite) is at least in part relevant to the superior service life of the refractory bodies of the invention under exacting conditions of steel making operation.

While the invention has been described with particular reference to specific embodiments, it is to be understood that it is not limited thereto, but is to be construed broadly and restricted solely by the scope of the appended claims.

What is claimed is:
1. A refractory structural element consisting essentially of
 (a) integrally bonded sintered grains of refractory material,
  (1) said grains consisting of magnesia having a maximum content of impurities of 2.5% $Fe_2O_3$, 0.5% $Al_2O_3$, 2% $SiO_2$, 5% CaO, and containing at least 93% but less than 96% magnesium oxide,
  (2) said sintered grains having an intragranular porosity of not more than 8%, and
  (3) defining therebetween pores in said element,
  (4) the intergranular porosity of said element being between 12 and 22% by volume; and
 (b) a carbonaceous material substantially uniformly distributed in said pores over the cross section of said element and substantially completely filling said pores.
2. An element as set forth in claim 1, wherein the maximum content of said impurities is 1.2% $Fe_2O_3$, 1% $SiO_2$, and 3% CaO.
3. An element as set forth in claim 2, wherein the combined maximum amount of $Fe_3O_2+Al_2O_3$ contained as impurities in said magnesia grains does not exceed 1.5%.
4. An element as set forth in claim 1, wherein said carbonaceous material substantially consists of carbon.
5. An element as set forth in claim 1, wherein said intergranular porosity is less than 20%.
6. An element as set forth in claim 1, wherein said magnesia grains have a needle-like crystal structure.
7. An element as set forth in claim 1, wherein the carbonaceous material is carbonized tar.

References Cited by the Examiner

UNITED STATES PATENTS 2,952,605  9/1960  De Varda _____ 106—56
3,148,238  9/1964  Willenbrock _____ 106—58

FOREIGN PATENTS 817,446  7/1959  Great Britain.

TOBIAS E. LEVOW, *Primary Examiner.*

J. POER, *Assistant Examiner.*